ELECTRICAL INTELLIGENCE STORAGE ARRANGEMENT

Filed May 25, 1955 3 Sheets-Sheet 1

*Inventors*
W. H. P. POULIART-
J. P. H. VANDEVENNE
By Robert Harding Jr.
*Attorney*

ELECTRICAL INTELLIGENCE STORAGE ARRANGEMENT

Inventors
W. H. P. POULIART
J. P. H. VANDEVENNE
By Robert Harding Jr.
Attorney

Sept. 17, 1957 W. H. P. POULIART ET AL 2,807,004

ELECTRICAL INTELLIGENCE STORAGE ARRANGEMENT

Filed May 25, 1955 3 Sheets-Sheet 3

*Inventors*
W. H. P. POULIART-
J. P. H. VANDEVENNE
By Robert Harding Jr.
*Attorney*

United States Patent Office 2,807,004
Patented Sept. 17, 1957

2,807,004

ELECTRICAL INTELLIGENCE STORAGE ARRANGEMENT

Willy H. P. Pouliart and Jean P. H. Vandevenne, Antwerp, Belgium, assignors to International Standard Electric Corporation, New York, N. Y., a corporation of Delaware Application May 25, 1955, Serial No. 511,093

Claims priority, application Netherlands June 25, 1954

9 Claims. (Cl. 340—174)

The invention relates to an electrical intelligence storage arrangement in which electric signals in binary form can be applied to storage means capable of storing them in that form and from which the original information represented by said signals can be read. It is particularly applicable, although not exclusively, to magnetic storage means, such as those which are used for electronic digital computers.

More particularly, the invention relates to a system wherein only one out of the two binary digits results in the systematic application of a signal to the storage means. Such an arrangement has been described in the application Serial No. 411,523, filed February 19, 1954. With such a system, a long succession of binary digits which are not those resulting in the application of a signal, means that no signals at all will be applied to the storage means. Since signals are applied to correspond with one of the two binary digits, the original information can, however, be correctly stored and recovered from the store by using a time base.

The absence of signals during a long time may, however, result in spurious signals being delivered when reading out the information from the store, whereby an incorrect information no longer corresponding with the original one might be read. Such a case might arise when using the system described in the above mentioned application. In this system, the signal applied to the storage means in correspondence with one particular binary digit results in a change from one state of saturation to another when the storage means are constituted by a magnetic drum. If this system is used in conjunction with the reading circuit described in U. S. Patent No. 2,704,361, issued March 15, 1955, these changes from one state of magnetisation to another will be differentiated and positive and negative pulses will be obtained, both of which correspond to one particular binary digit irrespective of the polarity of the pulse. As described in the last patent, the pulses of one polarity are used to charge one condenser while the pulses of opposite polarity are used to charge a second condenser. Also, the pulses of one polarity are used to discharge the condenser charged by the pulse of the other polarity and vice-versa. As the charge for both condensers is accomplished via unidirectional coupling means, the potential across either of the two condensers will alternatively be raised and decreased, such raises and decreases corresponding with reversals in the state of magnetisation of the drum surface and therefore corresponding to one particular binary digit out of the two. By charging through unidirectional coupling means, spurious pulses, which may, for example, arise due to imperfections in the nickel surface coating of the drum constituting the magnetic storage surface, will be unable to flow through the unidirectional coupling means, provided that they do not exceed the potential to which the condenser is charged, in which case the unidirectional coupling means will offer a high coupling impedance to such spurious pulses. Although, after having been charged by one pulse, a condenser will not discharge until the next pulse is received, one must reckon with the inherent leakage resistance of the condenser, which, together with the resistive load coupled across it, will mean that an exponential discharge will start as soon as the condenser is charged. If the time between successive pulses of alternate polarities is not high, there is no difficulty in avoiding an appreciable exponential discharge for the condenser which means that spurious pulses will still be prevented from affecting the potential across the condenser. If the time between successive pulses of alternate polarities is appreciable, it will be difficult to avoid a corresponding appreciable exponential decrease for the potential across the charged condenser, which means that any spurious pulse which has an amplitude greater than the partially discharged potential across the condenser will be able to flow through the unidirectional coupling means and affect the potential across the condenser. This is undesirable as it might result in incorrect reading of the information originally stored.

In application Serial No. 411,523, mentioned above, it has been proposed to avoid long intervals between successive reversals for the magnetisation state of the drum surface by interlacing a continuous series of signals corresponding to the one binary digit with the original binary information to be stored, thus causing a reversal of magnetisation for the sole purpose of ensuring a definite maximum time between successive reversals, these auxiliary reversals being disregarded when finally reading out the binary information. While this arrangement is satisfactory to limit the interval between successive reversals, it means that some storage space is lost to store these non-significant signals, and the shorter the interval is between successive reversals, the greater will be the loss of storage space.

In the same application it has also been proposed to restrict the binary code used so that a succession of binary digits which do not correspond to a reversal in magnetisation is kept below a definite maximum. This can be performed for example, when the original binary information is derived from decimal information, each decimal digit being translated into a 4-digit binary number. Since 16 combinations are then available for 10 decimal digits, some of the 16 combinations can be avoided, and in particular the one including four successive identical binary digits which are those which do not correspond to a reversal in magnetisation. However, when using a pure binary code such a restriction is not permissible.

The object of the invention is to provide means whereby long intervals between successive reversals are avoided while at the same time neither storage space is lost nor is a limitation imposed on the code to be used.

A more precise object of the invention is to limit the interval between successive reversals to a maximum of twice the minimum interval between successive reversals both of which are caused by two consecutive significant binary digits.

In accordance with the characteristic feature of the invention, an electrical intelligence storage arrangement is provided, together with binary information to be stored therein, and comprises a storage medium, e. g. a magnetic medium, the elements of which are capable of individually assuming one or the other of two distinct electrical conditions, e. g. saturation in one sense or the other. A first pulse source is provided which produces a first pulse frame with pulses following each other at a predetermined period T. A pattern counter is provided to produce a second pulse frame characterizing the intelligence to be stored, having the same frequency as the first, but in which a pulse is only present when it corresponds to one of the two binary digits and this in accordance with the binary information to be stored. Means, e. g. a rotating magnetic drum synchronized with the first frame, is provided individually to associate successive elements with successive pulses of said first frame, and means is provided to cause a change of an element from one condition to the other as a result of a pulse in said second frame. Means is also provided to produce a third pulse frame, characterizing the intelligence to be stored and having the same frequency as the first but in which a pulse is only present when it corresponds to the other of the two binary digits and this in accordance with the binary information to be stored, the means to cause a change for an element from one condition to the other as a result of a pulse in said second frame being effective after a time $$T'\left(\geq\frac{T}{2}\right)$$

following the occurrence of the pulse, whereas means are also provided to cause a change for an element as a result of a pulse in said third frame either after a time $$T'+\frac{T}{2}$$

or after a time $$T'-\frac{T}{2}$$

following the occurrence of the pulse and only when it does not either immediately precede $$\left(\text{for } T'+\frac{T}{2}\right)$$

or follow $$\left(\text{for } T'-\frac{T}{2}\right)$$

a pulse in said second frame.

In accordance with another characteristic feature of the invention, the pulses from said second frame are applied to a first device capable of assuming two distinct electrical conditions only one of which is stable, the device being driven to its unstable condition as soon as a pulse occurs, and for a time greater than $T/2$ and smaller than T, e. g. $3T/4$. The unstable condition of the first device unblocks a first gating circuit to the input of which a fourth pulse frame is applied having the same period T as the first, but phase-shifted by $T/2$, whereas its output pulses are applied to a second device similar to the first to bring it to its unstable condition as soon as a pulse occurs and for a time greater than $T/2$ and smaller than T, e. g. $3T/4$. And the unstable condition of said second device blocks a second gating circuit to the input of which the pulses from said third frame are applied, its output pulses being mixed with those from the first gating circuit to produce the required changes.

In accordance with another characteristic feature of the invention, the pulses from the second frame are applied to two electrically bistable devices to bring them both to their first stable condition as soon as a pulse occurs. The first stable condition of the first device unblocks a first gating circuit to the input of which the fourth pulse frame is applied. The pulses from the third frame are applied to the first device to bring it to its second stable condition as soon as a pulse occurs. The second stable condition of the first device unblocks a second gating circuit to the input of which the fourth pulse frame is applied, whereas its output pulses are applied to the second device to bring it to its second stable condition as soon as a pulse occurs. And the second stable condition of the second device unblocks a third gating circuit to the input of which said third pulse frame is applied whereby the paralleled output pulses from the first and third gating circuits produce the required changes.

The above mentioned and other objects and features of the invention will become more apparent and the invention itself will be best understood by referring to the following description of embodiments taken in conjunction with the accompanying drawings in which.

Figures 1, 2, 3, 4, 5, 6, 7:
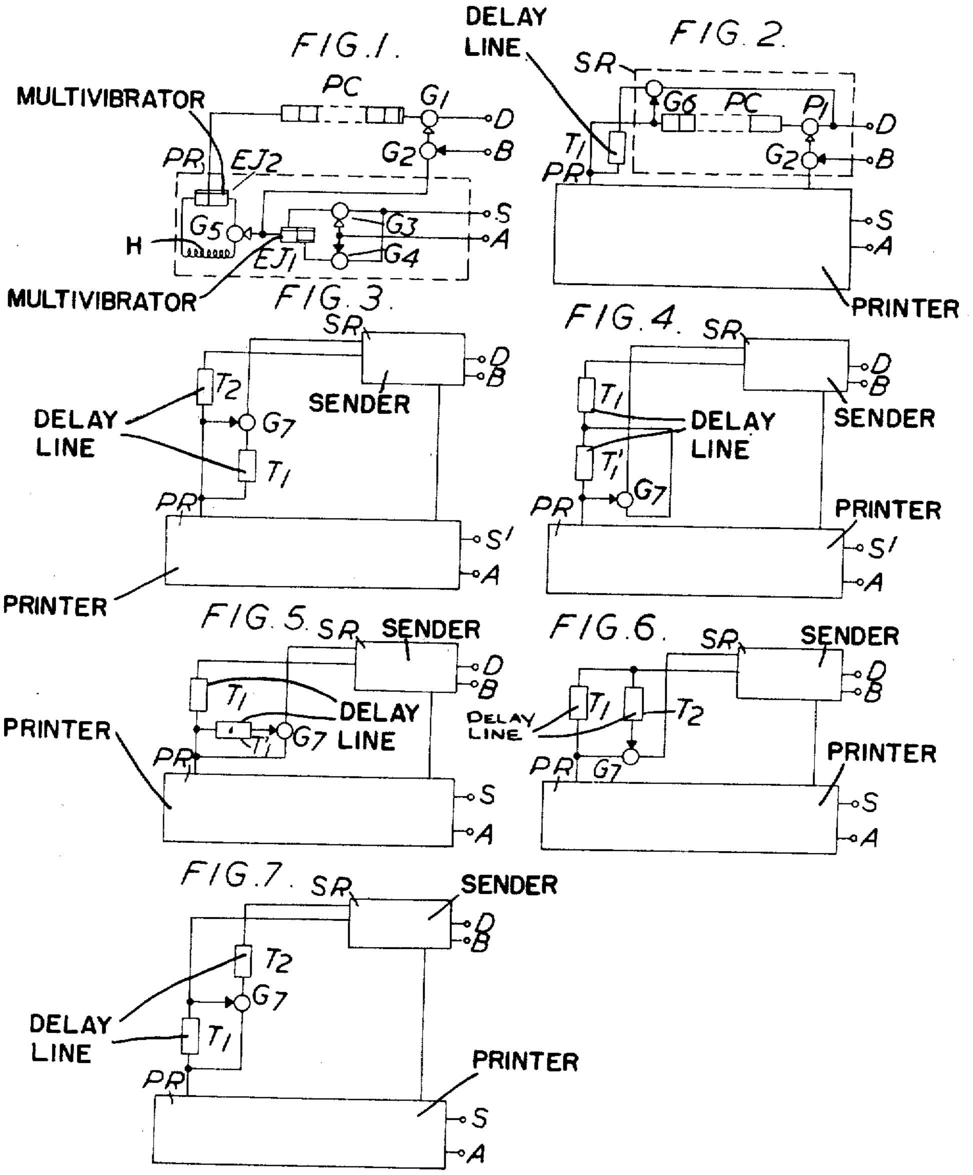
Fig. 1 is a schematic representation of an apparatus for storing signals on a magnetic drum by producing a change of saturation for one particular binary digit out of the two, the original information to be stored being in binary form.
Fig. 2 is a schematic representation of an apparatus in which long time intervals between successive reversals in the state of magnetisation are avoided.
Fig. 3 is a schematic representation of a first embodiment of the invention wherein long intervals between successive reversals are avoided without restricting the storage capacity of the drum.
Fig. 4 is a schematic representation of a second embodiment of the invention for achieving the same result.
Fig. 5 is a schematic representation of a third embodiment of the invention for achieving the same result.
Fig. 6 is a schematic representation of a fourth embodiment of the invention for achieving the same result.
Fig. 7 is a schematic representation of the invention for achieving the same result.

The circuit arrangement shown in Fig. 1 may be used to carry out the method described in application Serial No. 411,523, referred to above, by causing a reversal in the state of magnetisation of the nickel coating surface of a rotating magnetic drum for one particular binary digit only out of the two, it being assumed that the original information to be stored is in binary form. This original information is stored in a pattern counter PC which is shown here as a rectangle divided in a plurality of squares, each square corresponding to a stage of said counter and each stage permitting the storage of one binary digit. The first square to the right, corresponding to the first stage of the pattern counter, is distinguished by an additional vertical line closely spaced from the right hand short side of the rectangle. Each stage of the pattern counter can assume two electrically distinct stable conditions and binary information can be originally stored in such a counter either serially or in parallel by any known conventional means. A pattern counter of this type has been disclosed in the U. S. Patent No. 2,649,502, issued August 18, 1953.

When it is desired to transfer the information statically stored in that counter, consecutive pulses at a predetermined rate can be applied to it and output pulses will be derived which correspond to the input driving pulses for one particular binary digit only and one therefore obtains an output pulse frame which characterizes the information statically stored in the pattern counter. For example, if the first stage to the left of the counter PC is in the electrical condition corresponding to binary digit 0, the first input pulse fed to the counter PC may be made to produce an output pulse in phase with the input pulse. If the second stage to the left is not in the electrical condition corresponding to binary digit 1, the second input pulse will not result in an output pulse and so on.

When using a rotating magnetic drum for storing the information, the pulses for driving the pattern counter PC should be synchronized with the rotation of the drum so that the period T between successive driving pulses corresponds to a peripheral displacement of the drum surface equal to the length of an elemental area in which binary information is stored by saturating the magnetic medium in one sense or the other. The driving pulses are shown by $d$ in Fig. 11 and they are applied at terminal D to drive the pattern counter through a normally blocked gate $G_1$. This gate is represented by a circle with diametrically opposite leads which constitute respectively the input and the output leads, while a third lead also directed towards the centre of the circle is provided at right angles to the first two and with a white arrow indicating that a signal on that third control lead will unblock the gate, whereas the absence of a signal will leave the gate blocked. This control lead for the gate $G_1$ constitutes the output lead of the gate $G_2$ which differs from the gate $G_1$ in that it is a normally unblocked gate which can be blocked when there is a signal on the control conductor terminated by a black arrow, this to indicate the inhibiting action of the control signal. The input signal to the gate $G_2$ is obtained from the printer PR which is the circuit operating in conjunction with the recording head to produce the required reversals in the sense of saturation.

When a signal reaches the input of the gate $G_2$ from the printer PR and in the absence of an inhibiting signal on terminal B, the pulses $d$ which are applied at terminal D will be able to flow through the gate $G_1$ and drive the pattern counter PC, since the gates $G_1$ and $G_2$ are unblocked. As a result of the driving pulses being applied to the input of PC, a flow of pulses will be issued at the output thereof showing a dynamic pattern corresponding to the static pattern stored originally in PC.

Figure 11:
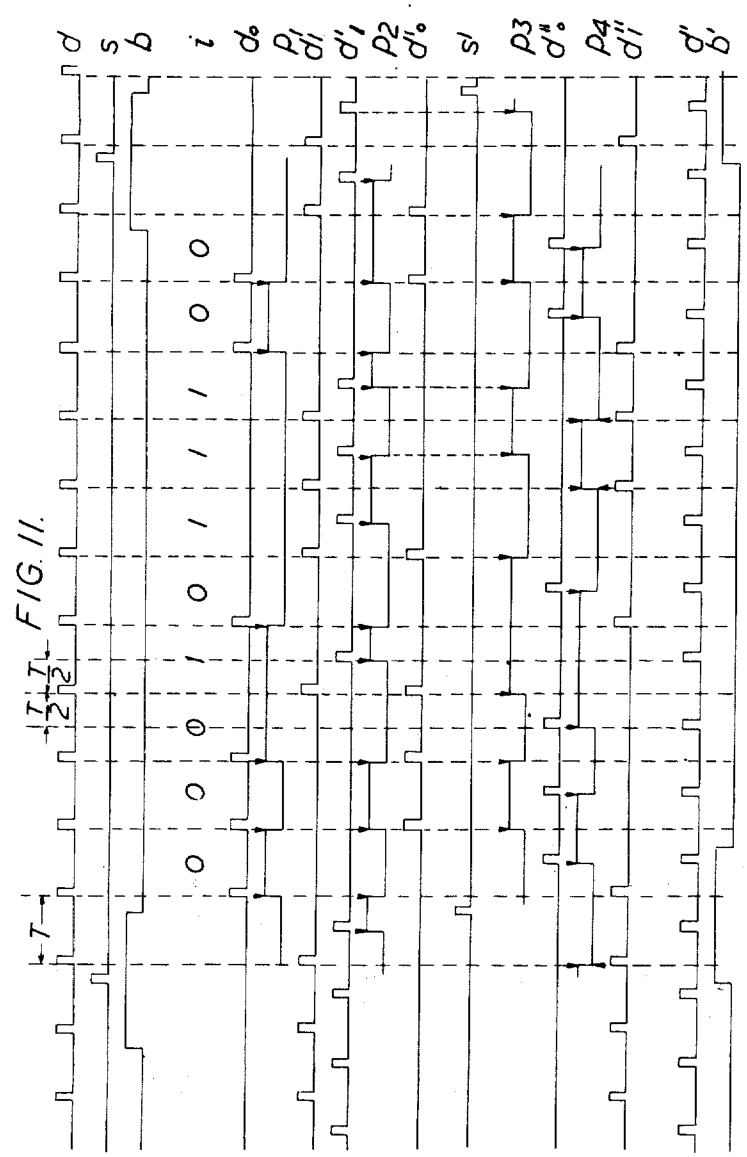
Fig. 11 represents pulse wave forms useful to explain the embodiments shown in Figs. 1 to 10.

If it is assumed by way of example that the pattern counter PC has ten binary stages and that the information stored in PC is as represented by $i$ in Fig. 11, the pulses at the output of PC will be as shown by $d_0$ in Fig. 11 if a stage in the zero condition corresponds to a pulse being issued at the output of PC.

The signal for unblocking the gate $G_1$ is obtained from a bistable multivibrator $EJ_1$, included in the printer PR and represented by a rectangle divided into two squares, each of which represents a stable condition for the bistable multivibrator. To indicate that a condition is stable, a parallel line close to one of the long sides of the rectangle in the square representing the condition concerned, has been drawn. In addition, this bistable multivibrator has one preferred stable condition into which it will settle automatically when the power is applied but from which it can depart when suitable driving input signals are applied. This preferred stable condition is indicated by an additional line parallel and close to one long side of the rectangle in the square concerned.

The bistable multivibrator is provided with two input leads, one for driving it to one stable condition and another for driving it to the other stable condition, each time by means of suitable pulses. Both series of input pulses are obtained from terminal S at which the pulses shown by $s$ in Fig. 11 are applied. These pulses are also synchronized with the rotation of the drum but they have a much lower frequency than the $d$ pulses.

The $s$ pulses, which will hereafter be called the sector pulses, are used to define sectors of length in a magnetic track. Each sector can cover an appreciable number of elemental lengths of track, each of which can store one binary digit. For explanatory purposes, however, Fig. 11 shows that the interval between successive sector pulses $s$ only covers 12 successive $d$ pulses. As, also by way of example, the pattern counter PC has been assumed to be able to register 10 binary digits, there are therefore two extra elemental lengths of storage or two extra $d$ pulses to which no outgoing pulses from the counter PC can correspond. These two extra intervals will be hereafter called the blank intervals and their purpose will be appreciated below.

Whereas terminal S is connected to an input of $EJ_1$ such that the application of a pulse will drive $EJ_1$ into its stable but non-preferred condition through a normally blocked gate $G_3$ similar to gate $G_1$ already described, it is also connected to an input of $EJ_1$ such that a pulse thereon will drive $EJ_1$ to its preferred stable condition through a normally unblocked gate $G_4$ similar to gate $G_2$ already described. The control leads of gates $G_3$ and and $G_4$ are both connected to terminal A and by applying a particular potential to that terminal A, it will be possible to unblock the gate $G_3$ while simultaneously blocking the gate $G_4$. Normally, however, the sector pulses applied at terminal S will leave the bistable multivibrator $EJ_1$ in its original preferred stable condition, since these pulses can only flow through the gate $G_4$ and are prevented from flowing through the gate $G_3$. As soon as a printing signal is given at terminal A, these gate conditions will be reversed and the next sector pulse to arrive will be able to flow through the gate $G_3$ and drive $EJ_1$ into its second non-preferred stable condition. In this condition, $EJ_1$ will apply a signal to the control conductor of a gate $G_5$ similar to gate $G_1$ which will then be unblocked.

The input and output conductors of this gate $G_5$ are formed by the two output conductors from another bistable multivibrator $EJ_2$ which need not have a preferred stable condition and which is provided with a single input lead to which the output pulses from the pattern counter PC are applied. The bistable multivibrator $EJ_2$ is so designed that any pulse reaching its common input will reverse it from one stable condition to the other, and this may be used to reverse the sense of the output current flowing between the two output conductors from $EJ_2$ through the gate $G_5$ which is now unblocked. As the connection between the two output leads from $EJ_2$ also includes the winding of the recording head H in series, from the moment that the gate $G_5$ is unblocked, a current will flow through the winding H and can be designed to have a suitable intensity permitting the saturation of the magnetic length of track which happens to move past the recording head while the gate $G_5$ is unblocked. Upon a pulse being received at the common input of $EJ_2$, the sense of the current through the head will be reversed which means that there will be a reversal in the sense of saturation for the track at the point which happens to be next to the recording head when the pulse is received at the input of $EJ_2$.

From the moment that the printing condition is applied at terminal A, a current will therefore flow in one sense or the other through the winding of the recording head, but no pulses will yet be able to reach the common input of $EJ_2$, since the driving pulses $d$, applied at terminal D, are not yet able to flow through the gate $G_1$, since, at the moment that a sector pulse $s$ is received, there is a blank pulse, shown by $b$ in Fig. 11, applied at terminal B in Fig. 1 to block the gate $G_2$ and thereby prevent the unblocking of the gate $G_1$.

As shown in Fig. 11, these blocking pulses $b$ have the same frequency as the sector pulses $s$, but have a longer duration, so that they cover the $d$ pulse immediately preceding the $s$ pulse and the $d$ pulse immediately following the $s$ pulse. Therefore, although the gate $G_5$ is unblocked, following the appearance of the first $s$ pulse after a printing signal has been given at terminal A, the first $d$ pulse following this $s$ pulse will be unable to reach PC and the next $d$ pulse will be the first to flow through the gate $G_1$. This pulse together with the following $d$ pulses will cause the pulse pattern represented by $d_0$ in Fig. 11 to be applied to the printer PR and more particularly to the input of $EJ_2$. This will cause a corresponding pattern of reversals in the sense of the current through the recording head and in the sense of saturation for the corresponding length of magnetic track which rotates past the head. This is shown by $p_1$ in Fig. 11, and it is seen that each reversal is caused by the $d$ pulses which correspond to the significant binary digit zero, i. e. the $d_0$ pulses.

The arrangement shown in Fig. 1 thus permits the application of the system described in application Serial No. 411,523.

When it is desired to stop the printing, it is merely sufficient to interrupt the printing condition at terminal A, whereby the next sector pulse will now flow through the gate $G_4$, restore $EJ_1$ into its preferred stable condition and thereby block the gates $G_1$ and $G_5$, whereby printing is interrupted.

The purpose of avoiding reversals, such as those shown by $p_1$ in Fig. 11, close to a sector pulse $s$ by applying the blank pulses $b$ to delay the application of the driving pulses $d$, is to prevent a reversal taking place at less than T units of time from the sector pulse which might occur if the blank intervals defined by the $b$ pulses were not used. In such a case, a sector pulse at the start of a printing sector might cause a reversal which might be followed by a significant reversal corresponding to the first digit being the significant digit 0 and these pulses would therefore be spaced by less than T units of time which has been calculated as the minimum period between adjacent pulses to avoid interference between those and destruction of information.

The same situation could arise at the end of a printing sector. With the arrangement shown in Figs. 1 and 11, this is not possible, and a reversal caused by a sector pulse is always at an interval greater than T time units from the next or the previous reversal corresponding to the significant binary digit 0.

If the binary code is unrestricted, there is however, the possibility of a long succession of non-significant binary digits 1 following one another, during which time no reversals will take place, and this may be undesirable, as explained in the preamble of the specification.

The arrangement of Fig. 2 permits the limitation of the maximum interval between successive reversals and includes a printer PR which is not shown in detail, as it is identical to that shown in Fig. 1. It has one input lead connected to the output of the pattern counter PC and leading to $EJ_2$ and one output lead controlled by $EJ_1$ and which constitutes the input of the gate $G_2$.

Apart from being applied to the output of gate $G_1$, the $d$ pulses are also applied to the input of a gate $G_6$ which is normally unblocked and of the same type as the gate $G_2$. This gate is controlled by the pulses at the output of PC which cause it to be blocked. Therefore, the pulses which appear at the output of the gate $G_6$ are in phase with the $d$ pulses but complementary as to their time location with respect to the pulse pattern shown by $d_0$ in Fig. 11. In this figure, the pulses at the output of $G_6$ are shown by $d_1$.

These pulses are also applied to the input of PR, together with the pulses from PC, but through a time delay device $T_1$ which delays them by exactly $T/2$. Hence, the pulses at the output of $T_1$ will be as shown by $d'_1$ in Fig. 11. These pulses, in conjunction with the pulses $d_0$, will produce a pattern of reversals, as indicated by $p_2$ in Fig. 11.

From this last waveform, it can be seen that the maximum interval between the successive reversals will never exceed $3T/2$, but on the other hand, the minimum interval between successive reversals is brought down to $T/2$ which means that one would have to double the period T in order to avoid interference between adjacent reversals. This means that the arrangement of Fig. 2 would require twice as much space for printing the information than the arrangement of Fig. 1, and the solution is therefore not satisfactory, since one might as well, as proposed in the application Serial No. 411,523, regularly devote one T interval for the purpose of printing a 0 digit which is devoid of significance and is only used to limit the maximum interval between successive reversals. In that case the maximum interval between successive reversals would be $(n+1)T$ where $n$T represents the period between these zero signals devoid of significance and the percentage increase in storage space would be $1/n$ and could be determined at will.

By studying that part of Fig. 11 already described, it can be appreciated that, while it is desirable to introduce auxiliary reversals, as produced by the wave froms $d'_1$, in which the pulses are always phase-shifted by $T/2$ from the pulses produced by the zero digits, these reversals should only be applied when there is an interval between two successive zero pulses which is greater than 2T. Otherwise, the $d'_1$ pulse is always likely to be spaced from an adjacent, i. e. following zero pulse, by $T/2$. On the other hand, a phase-shift of $T/2$ for the $d'_1$ pulses is necessary, since otherwise the reversals caused by these pulses would be synchronized with the $d$ pulses, and, when reading out, they would not be distinguishable from the pulses corresponding to the binary digit zero. By introducing a phase shift of $T/2$, one can discriminate between the reversals caused by the $d_0$ pulses and those caused by the $d'_1$ pulses, whereby those latter reversals can be disregarded when finally reading out the original information.

In the circuit of Fig. 3, the same printer PR shown in detail in Fig. 1 is used and shown as a block diagram. The arrangement shown in Fig. 2 and comprising the pattern counter PC and the gates $G_1$, $G_2$ and $G_6$, and which is labelled SR is again used in Fig. 3 and shown therein as a block diagram. The pulses $d_1$ at the output of the gate $G_6$ are still applied from the sender SR to the printer PR through time delay means $T_1$ which delay them exactly by $T/2$, but prior to being fed to the input of $T_1$, these pulses have to go through a normally unblocked gate $G_7$ of the same type as $G_2$. The control lead of this gate $G_7$ is connected to the output of the time delay means $T_2$ producing a delay equal to T, to the input of which the $d_0$ pulses at the output of PC are applied from the sender SR. The output of $T_2$ is paralleled to the output of $T_1$ and the pulses which issue from both these time delay means are applied to the printer PR to drive the bistable multivibrator $EJ_2$. For this circuit, T' is therefore equal to T and the gate $G_7$ will prevent the $d_1$ pulses from producing corresponding $d'_1$ pulses if the $d_1$ pulse concerned immediately follows a $d_0$ pulse. In other words, if a $d'_0$ pulse (Fig. 11), which corresponds to a $d_0$ pulse delayed by T, coincides with a $d_1$ pulse, the gate $G_7$ will be blocked and no corresponding $d'_1$ pulse will be issued at the output of $T_1$. Hence, a pattern of reversals, as shown by $p_3$ in Fig. 11, will be obtained for the circuit of Fig. 3. This pattern $p_3$ is similar to the pattern $p_1$ except that it is phase-shifted by T and that the 4T interval which appeared in the $p_1$ pattern has been broken up in the $p_3$ pattern due to the effect of two $d'_1$ pulses for which the preceding $d_1$ pulses do not correspond with $d'_0$ pulses.

To read out the information, a reading circuit of the type disclosed in the U. S. Patent No. 2,704,361, issued March 15, 1955 may be used and with such an arrangement, the potential across the two condensers will change from one value to the other in step with the reversals shown by $p_3$ whereby the maximum interval during which a charge across a condenser can leak off, is limited to 2T. The rectangular wave forms across the condensers can then be differentiated so that pulses are obtained which are either in coincidence with a $d$ pulse or which are phase shifted by $T/2$ with respect to the latter. These pulses can therefore be easily segregated and only those in phase with the $d$ pulses should be retained, since these will then produce a pulse pattern identical to the $d_0$ pulse pattern representing the original information $i$ stored in the rotating magnetic drum. The only difference is a phase-shift of exactly one period T and this can be taken care of by using the blank pulses $b'$ shown in Fig. 11 and reading only the wave forms across the condensers during the interval between $b'$ pulses. These will achieve the desired result, since they are of the same frequency as the $b$ pulses but show a phase lag of exactly a period T with respect to the blank pulses $b$ used for printing.

It should also be remarked that with the arrangement of Fig. 3 the sector pulses $s'$ should be used instead of the sector pulses $s$. These have exactly the same frequency as the former but show a phase lag of exactly one period T which means that there is no blank interval at the start of a sector but there are two blank intervals at the end of the sector. This is necessary in view of the delay $T_0=T$ produced by the time delay means $T_2$ for the $d_0$ pulses. With such an arrangement a significant reversal in phase with the $d$ pulses will always occur at more than T from the beginning or the end of a sector, as defined by the $s'$ pulses, whereby these significant reversals can never be mutilated.

Fig. 4 represents an alternative arrangement to that shown in Fig. 3, but instead of using the two time delay means $T_1$ and $T_2$ which produce respective delays of $T/2$ and T, two time delay means $T_1$ and $T'_1$ are used which each produce a delay equal to $T/2$. As the time delay means $T_1$ and $T'_1$ are used in cascade for applying the $d_0$ pulses to the input of PR, this circuit still receives the same $d'_0$ pulses. Also, the time delay means $T'_1$ are used not only for the $d_0$ pulses but also for the $d_1$ pulses once they are allowed to go through the gate $G_7$ when the latter is unblocked, and some of the $d'_1$ pulses are thus allowed to reach the input of PR in exactly the same way as for the arrangement in Fig. 3, whereby the same pattern of reversals $p_3$ is produced. The sector pulses $s'$ should again be used for printing purposes and the blank pulses $b'$ for reading purposes.

For the arrangement shown in Fig. 5, T′ is made equal to $T/2$ by feeding the $d_0$ pulses to the input of PR through time delay means $T_1$ producing a delay equal to $T/2$. On the other hand, the $d_1$ pulses are fed without delay to the input of PR but have to pass through the normally unblocked gate $G_7$. These last pulses should be prevented from reaching PR if they immediately follow a $d_0$ pulse. To effect this, the output of $T_1$ is used to control the gate $G_7$ through other time delay means $T'_1$ which also produce a delay equal to $T/2$. The pulses at the output of $T_1$ are shown by $d''_0$ in Fig. 11, and these pulses will cause the significant reversals. In addition, the $d_1$ pulses which do not coincide with a $d'_0$ pulse will produce auxiliary reversals, so that a reversal pattern, as shown by $p_4$, will be obtained. In this case the sector pulses $s$ together with the blank pulses $b$ should be used to prevent significant reversals corresponding to the binary digit zero from following or preceding an $s$ pulse by less than T. Here again the minimum and maximum intervals between successive reversals are respectively equal to T and 2T, and the same reading technique as described in relation to Fig. 3 can be used, but using the $b$ blank pulses.

Fig. 6 represents an alternative arrangement to that shown in Fig. 5. The $d_0$ pulses are still delayed by $T/2$ by means of the time delay means $T_1$ before they can reach the input of PR, while the $d_1$ pulses are not delayed but have to flow through the normally unblocked gate $G_7$. This time, however, this gate is controlled by the $d_0$ pulses instead of by the $d''_0$ pulses by using time delay means $T_2$ providing a delay equal to T. The reversal pattern is still that shown by $p_4$. It will be evident that instead of controlling the normally unblocked gate $G_7$ by the $d_0$ pulses through $T_2$, a normally blocked gate controlled by the $d_1$ pulses through $T_2$ could also be used with the same results.

Fig. 7 represents an arrangement in which $$T'=\frac{T}{2}$$

but in which the $d_1$ pulses are delayed by T prior to reaching the input of PR. This means that the $d_1$ pulses should be prevented from causing a reversal when they immediately precede a $d_0$ pulse. This is achieved by feeding the $d_1$ pulses from SR to the input of PR through time delay means $T_2$ providing a delay equal to T, the output of $T_2$ being applied to the input of the gate $G_7$ which is normally unblocked and the output of which is connected to the input of PR. The pulses at the output of $T_2$ are shown by $d''_1$ in Fig. 11. The $d_0$ pulses are fed to the input of PR through the time delay means $T_1$ providing a delay equal to $T/2$, and these $d_0$ pulses directly control the gate $G_7$. Here again, the $d''_0$ pulses at the output of $T_1$ will produce significant reversals as shown by $p_4$ while the $d''_1$ pulses will produce non-significant reversals if they do not coincide with a $d_0$ pulse. The arrangement of Fig. 7 therefore produces the same pattern of reversals as the arrangement of Figs. 5 and 6. Here again, the sector pulses $s$ should be used for printing and the blank pulses $b$ both for printing and reading.

Although the arrangement of Figs. 3–7 have the advantage that they necessitate only two time delay means and one inhibiting gate, and that for the arrangements in Figs. 4 and 5 the two time delay means can be identical, which means are simpler than those which would be necessary if other arbitrary values were chosen for $T_0$, actual time delay means in the form of artificial lines, magnetostrictive lines, phantastrons, etc. are rather expensive in accordance with present technique, especially if sufficient accuracy is desired. Also, if time constant devices using capacitors are contemplated, these are likely to prove expensive if sufficient safety is to be ensured.

Figure 8:
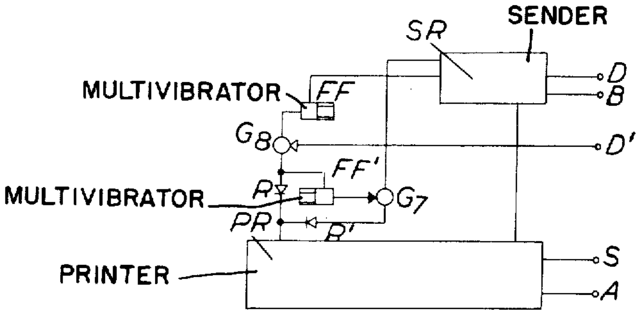
Fig. 8 is a schematic representation of a sixth embodiment of the invention derived from the embodiment shown in Fig. 5.

Fig. 8 shows an arrangement based on Fig. 5 and in which the two time delay means $T_1$ and $T'_1$ are respectively replaced by two monostable multivibrators FF and FF′, an additional gate $G_8$ of the same type as $G_1$ and controlled by an additional pulse frame $d'$, shown in Fig. 11 and applied to terminal D′ in Fig. 8, being necessary. The monostable multivibrators FF and FF′ are represented in the same way as the bistable multivibrators in Fig. 1, two adjoining squares forming a rectangle being used to denote the two possible electrical conditions of the device and in one of these squares two parallel lines have been added close to the long sides of the rectangle to indicate that one of the two electrical conditions is stable and preferred. The $d_0$ pulses are fed to the monostable multivibrator FF so that a pulse will drive it from its stable to its unstable condition and the device will remain in the unstable condition after the disappearance of the pulse for a duration which is dependent on its time constant. When FF is in the unstable condition, a signal is applied to the input of the gate $G_8$ of the same type as $G_1$ in Fig. 1, which during the occurrence of a pulse from source $d'$ which is applied at terminal D′, will result in an output pulse from the gate $G_8$ coinciding with the $d'$ pulse being applied to the input of PR via the decoupling means R. As the $d'$ pulses have the same frequency as the $d$ pulses but are phase shifted by a half period from the latter, this means that the $d''_0$ pulses will be applied to the input of PR. Since the device FF must still be in its unstable condition when a pulse $d'$ is received, its recovery time constant should be at least equal to $T/2$ and since the monostable multivibrator FF should be restored to its stable condition before the next $d_0$ pulse arrives, if it is assumed the latter has no effect on FF when in the unstable condition, the recovery time constant should also be smaller than T. Hence, a time constant of about $3T/4$ should preferably be chosen. The $d''_0$ pulses at the output of the gate $G_8$ are also used to drive the monostable multivibrator FF′ from its stable to its unstable condition. When it is in its stable condition, the device FF′ does not block the gate $G_7$ through which the $d_1$ pulses find access to the input of PR, via the decoupling means R′ which, together with R, avoid an undesirable triggering of FF′. Hence, the $d_1$ pulses will only be effective to cause reversals when they do not immediately follow a $d_0$ pulse, since the latter would result in the monostable multivibrator FF′ being thrown to its unstable condition at a time T, after its occurrence. Therefore, the reversal pattern obtained is that shown by $p_4$ in Fig. 11.

Figure 9:
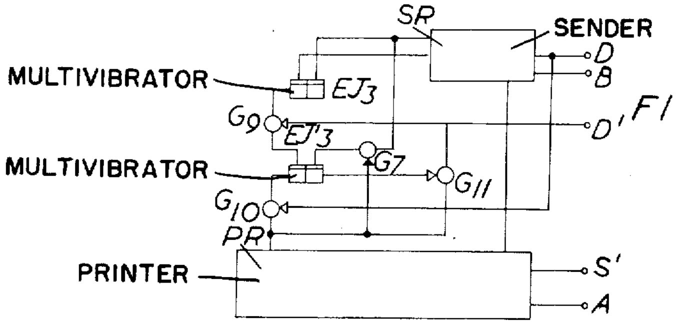
Fig. 9 is a schematic representation of a seventh embodiment of the invention derived from the embodiment shown in Fig. 4.

Fig. 9 shows an arrangement derived from Fig. 4 but in which the time delay means $T_1$ and $T'_1$ shown in that figure are respectively replaced by two bistable multivibrators $EJ_3$ and $EJ'_3$, three additional gates $G_9$, $G_{10}$ and $G_{11}$ being used in addition to the pulse frame $d'$ already used in Fig. 8. As the change of the conditions for the bistable devices $EJ_3$ and $EJ'_3$ are positively controlled from the $d$ and $d'$ pulses, the use of marginal time constants is entirely avoided. The $d_0$ pulses are applied to the left-hand input of $EJ_3$, so that a $d_0$ pulse drives this device into its first stable condition which results in the application of a particular potential at the input of the gate $G_9$, which is of the same type as $G_1$ in Fig. 1. Hence, during the occurrence of a controlling pulse $d'$ an output pulse having the same location as the $d'$ controlling pulse will be fed to the first input of the bistable multivibrator $EJ'_3$ to drive it into its first condition, causing the application of a potential condition at the input of the gate $G_{10}$, which is of the same type as $G_9$, such that during the occurrence of a controlling $d$ pulse, the gate $G_{10}$ will be unblocked and a pulse will be issued to the input of PR. Thus the $d_0$ pulses will be applied to PR with a delay equal to T, i. e. the $d'_0$ pulses will appear at the input of PR. The $d_1$ pulses are applied to the second input of $EJ_3$ to drive it into its second stable condition and they are also applied through the normally unblocked gate $G_7$ to the second input of $EJ'_3$ to drive it into its second stable condition. Since the gate $G_7$ is controlled by the $d'_0$ pulses which appear at the input of PR, the $d_1$ pulses coinciding with a $d'_0$ pulse will not be able to drive $EJ'_3$ into its second stable condition, and it is only when a $d_1$ pulse not immediately following a $d_0$ pulse appears, that $EJ'_3$ will reach its second stable condition for which the gate $G_{11}$, of the same type as $G_9$, will be unblocked, allowing the passage of the $d'$ pulse which follows the $d_1$ pulse. As the output of the gate $G_{11}$ is also fed to the input of PR, the reversal pattern shown by $p_3$ in Fig. 11 will be obtained. As for Fig. 4, the $s'$ sector pulses should be used with the arrangement of Fig. 9.

Figure 10:
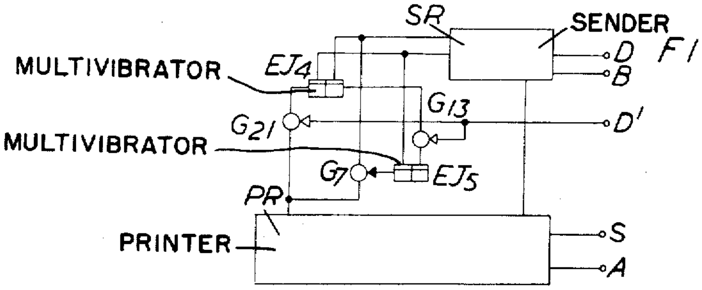
Fig. 10 is a schematic representation of an eighth embodiment of the invention derived from the embodiment shown in Fig. 6.

Fig. 10 represents an arrangement derived from Fig. 6 but in which the time delay means $T_1$ and $T_2$ are replaced by two bistable multivibrators $EJ_4$ and $EJ_5$, two additional gates $G_{12}$ and $G_{13}$, together with the pulse frame $d'$, being necessary. The $d_0$ pulses are applied to the first input of $EJ_4$, as well as to the first input of $EJ_5$, causing both $EJ_4$ and $EJ_5$ to be driven to their first stable condition. When $EJ_4$ is in its first stable condition, it applies a potential condition at the input of gate $G_{12}$ which is such that during the occurrence of a $d'$ pulse which controls this gate, the latter gate will deliver a pulse at its output which is applied to the input of PR. The $d_1$ pulses are fed to the second input of $EJ_4$ and used to drive the latter into its second stable condition in which it will control the gate $G_{13}$ in exactly the same way as the first condition of $EJ_4$ controls the gate $G_{12}$, whereby a $d'$ pulse will be fed to the second input of $EJ_5$ to drive it into its second stable condition. When $EJ_5$ is in its second stable condition, the gate $G_7$ is unblocked, whereby the $d_1$ pulses are able to reach the input of PR. Therefore, the reversal pattern produced will be that shown by $p_4$ in Fig. 11.

When using two bistable devices, the arrangement of Fig. 10, producing the $p_4$ pattern, may be advantageous with respect to that of Fig. 9, producing the $p_3$ pattern, since one gate can be dispensed with.

The arrangement of Fig. 10 can also be slightly modified, so that it corresponds to the arrangement shown in Fig. 5, simply by eliminating the direct connection which applies the $d_0$ pulses to the first input of the $EJ_5$ and replacing the latter by a connection from the output of the gate $G_{12}$ to the first input of $EJ_5$. In such a case, the output from $G_{12}$ to PR and the output to the first input of $EJ_5$ should be connected through unidirectional coupling means poled in the same way to avoid that a $d_1$ pulse appearing at the input of PR should bring $EJ_5$ to its first stable condition.

It should be understood that the gates, time delay means, bistable and monostable vibrators, and the pattern counter, symbolically represented in the figures, are susceptible of many different realizations and the designer will have no difficulty in selecting those realizations which are most appropriate and most economical for the purpose of the invention, as explained above. Similarly, the $d$, $d'$, $s$, $s'$, $b$ and $b'$ pulses can be obtained in any desired and suitable manner provided that the required synchronization with the rotation of the drum is obtained. Preferably, however, all or part of these pulses should be obtained from special tracks on the magnetic drum which method automatically ensures the required synchronization. Also, although all the pulses are shown in Fig. 11 as positive, with the positive flanks active to cause the next operation, this is not essential and the polarity as well as the means to make the pulses effective may be varied in accordance with design of the means cooperating with these pulses.

Although the invention has been described in relation to the storage of information in particular storage means, it should be appreciated that, whenever it is desired to transmit information in binary form by sending a signal in correspondence with one particular binary digit only out of the two, whereby a prolonged absence of signals can occur, the invention can also be applied to limit the intervals between signals to twice the minimum spacing between signals if spurious conditions are likely to cause incorrect operation of the receiving device.

It should also be remarked that although two basic pulse frames $d$ and $d'$ have been used, as this is believed to provide the simplest solutions, if one is prepared to use additional pulse frames, many other solutions for carrying out the invention can be obtained. For example, by considering Fig. 9, it is by no means essential that the gate $G_9$ should be controlled by the $d'$ pulses which are phase shifted exactly by $T/2$ from the $d$ pulses, and a different phase shift could be used. Since, however, the $d'$ pulses are necessary for feeding the printer PR, an additional pulse frame would be used without producing any advantage. In general, it is not believed that any of the many solutions using additional pulse frames would compensate this disadvantage by a reduction in the other means, such as the monostable or bistable multivibrators and gates which have been used.

Although blank pulses $b$ and $b'$ have been shown, these could be avoided, if desired, by using sector pulses in phase with $d$ pulses and differing only in frequency.

These could be fed to the gates $G_3$ and $G_4$ (Fig. 1) via an additional delay device, producing a delay equal to $T/2$. The gate $G_2$ would be replaced by a short-circuit, the terminal B becoming redundant. The input of gate $G_6$ (Fig. 2) would no longer be directly connected to terminal D but would be connected from the output of gate $G_1$, through an additional normally unblocked gate, controlled from the output of the additional delay device, mentioned above, through a second additional delay device also producing a delay equal to $T/2$. Finally, a second additional, normally unblocked, gate would be inserted between gate $G_1$ and the D terminal and would be controlled from terminal S. Then, using the arrangement shown in Fig. 5, the pattern shown by $p_4$ (Fig. 11) will be obtained and no pulse can reach $EJ_2$ less than T after the reversal of $EJ_1$.

Alternatively, two additional normally unblocked gates could be serially inserted between the output of gate $G_1$ and the input of PC (Fig. 2). The first of these additional gates would be controlled directly from terminal S and the second from this terminal also, but through an additional delay device producing a delay equal to T. The output from this delay device would also be used to feed the gates $G_3$ and $G_4$ (Fig. 1). The gate $G_2$ would be replaced by a short-circuit, terminal B becoming redundant. The input of gate $G_6$ would no longer be directly connected to terminal D but would be connected to the output of gate $G_1$ which is connected to the two additional gates in series.

It will be evident that the invention is generally applicable to a system of recording where for one of the two binary digits there is never a change from one state of magnetisation to the other. It might be applicable to the systems mentioned in the U. S. Patent No. 2,540,654 where two successive changes correspond to one binary digit and none to the other, or more particularly to the "non-return-to-zero" system where a change corresponds to one binary digit directly following the other and which, therefore, might also lead to long intervals during which no changes occur.

While the principles of the invention have been described above in connection with specific apparatus, it is to be therefore clearly understood that this description is made only by way of example and not as a limitation on the scope of the invention.

What is claimed is:

1. An electrical intelligence storage arrangement adapted to receive and store binary information therein comprising a storage medium having a plurality of elements which are capable of individually assuming one or the other of two distinct electrical conditions, means for producing a first pulse frame with pulses following each other at a predetermined period T, pattern counter means for producing a second pulse frame characterizing the intelligence to be stored, said second pulse frame having the same frequency as the first but in which a pulse is present only when it bears a particular relation in time to one of the two binary digits in accordance with the binary information to be stored, means operated in synchronism with said first pulse frame for individually associating successive elements of said storage medium with successive pulses of said first frame, and means to cause a change of an element from one condition to the other as a result of a pulse in said second frame, means for producing a third pulse frame characterizing the intelligence to be stored, having the same frequency as the first pulse frame but in which a pulse is present only when it corresponds to the other of the two binary digits and is in accordance with the binary information to be stored, the means for causing a change of an element as a result of a pulse in said second frame being effective after a time $$T'\left(\geq\frac{T}{2}\right)$$

following the occurrence of the pulse, and means for causing a change of an element as a result of a pulse in said third frame after a time $$T'+\frac{T}{2}$$

or after a time $$T'-\frac{T}{2}$$

following the occurrence of the pulse and only when it does not either immediately precede $$\left(\text{for } T'+\frac{T}{2}\right)$$

or follow $$\left(\text{for } T'-\frac{T}{2}\right)$$

a pulse in said second frame

2. An electrical intelligence storage arrangement, as claimed in claim 1, further comprising a gating circuit having an input and an output, first delay means acting to delay the pulses from the second frame by T, means for causing said delayed pulses temporarily to block said gating circuit, means for applying the pulses from the third frame to the input of said gating circuit, second delay means producing a delay $T/2$, and means for connecting the output of said gating circuit to said second delay means, the outputs of both delay means being paralleled to issue the pulses causing the required changes.

3. An electrical intelligence storage arrangement, as claimed in claim 1, further comprising first delay means having a delay of $T/2$, means for causing said first delay means to delay the pulses from said second frame by $T/2$, second delay means having a delay of $T/2$, means for applying said delayed pulses from said first delay means to said second delay means, a gating circuit having an input and an output, means for applying the pulses from the third frame to the input of said gating circuit, means for applying the delayed pulses at the output of said second delay means to said gating circuit to block said gating circuit, the output of said gating circuit being connected to the input of said second delay means, whereby the pulses at the output of said second delay means cause the required changes.

4. An electrical intelligence storage arrangement, as claimed in claim 1, further comprising first and second delay means each having an input and an output and producing a delay of $T/2$, means for connecting the pulse from said second frame to the input of said first delay means, means for applying the delayed pulses at the output of said first delay means to said second delay means, a gating circuit, means for causing the delayed pulses at the output of said second delay means temporarily to block said gating circuit, and means for applying pulses from the third frame to the input of said gating circuit, the output of said gating circuit being paralleled with the output of said first delay means to issue the pulses causing the required changes.

5. An electrical intelligence storage arrangement, as claimed in claim 1, further comprising first and second delay means having delays of $T/2$ and T, respectively, means for connecting the pulses from said second frame to said first delay means, said second delay means having its input paralleled to the input of said first delay means, a gating circuit having an input and an output, means for causing the delayed pulses at the output of said second delay means temporarily to block said gating circuit, means for applying the pulses from said third frame to the input of said gating circuit, the output of said gating circuit being paralleled with the output of said first delay means to issue the pulses causing the required changes.

6. An electrical intelligence storage arrangement, as claimed in claim 1, further comprising first and second delay means having a delay of $T/2$ and T, respectively, means for connecting the pulses from said second frame to said first delay means, means for connecting the pulses from said third frame to said second delay means, a gating circuit having an input and an output, means for causing the pulses from said second frame temporarily to block said gating circuit, means for applying the output pulses from said second delay means to the input of said gating circuit, the output of said gating circuit being paralleled with the output of said first delay means to issue the pulses causing the required changes.

7. An electrical intelligence storage arrangement, as claimed in claim 4, in which said first and second delay means have a delay greater than $T/2$ and less than T and each comprises a device capable of assuming two distinct electrical conditions only one of which is stable and being arranged so that a pulse applied to the inlet of the delay means will drive said device to its unstable condition as soon as said pulse occurs and for a time greater than $T/2$ and less than T, said arrangement further comprising a second gating circuit, means responsive to the device of said first delay means being in its unstable condition for applying a potential to the input of said second gating circuit, means for producing a fourth pulse frame having the same period T as the first but phase shifted by $T/2$, means for applying the pulses from said fourth pulse frame to said second gating circuit for unblocking said circuit, means for applying the output pulses from said second gating circuit to the input of the second delay circuit to cause the second device thereof to assume its unstable condition as soon as a pulse occurs and for a time greater than $T/2$ and less than T, and means for causing the unstable condition of said second device to block said first gating circuit to the input of which the pulses from said third frame are applied, the output pulses of said first gating circuit being mixed with those from said first delay means which pass through said second gating circuit to produce required changes.

8. An electrical intelligence storage arrangement, as claimed in claim 3, in which said first and second delay means each comprise and electrically bistable device having two inputs, the device being arranged so that a pulse delivered to either input will drive the device to the stable condition corresponding to that input, said arrangement further comprising second, third, and fourth gating circuits each having an input and an output, means for applying pulses from the second frame to the first input of the device of said first delay means to drive it to its first stable condition as soon as a pulse occurs, means responsive to said first stable condition of the device of said first delay means for applying a potential to the input of said second gating circuit, means for producing a fourth pulse frame having the same period T as the first but phase shifted by $T/2$, means for causing pulses from said fourth pulse frame to unblock said second gating circuit, means for applying the output pulses from said second gating circuit to the first input of second delay means for driving the device thereof to its first stable condition as soon as a pulse occurs, means responsive to said first stable condition of the device of said second delay means for applying a potential to said third gating circuit, means for causing pulses from said first pulse frame to unblock said third gating circuit, means for applying the pulses from said third frame to the second input of said first delay means to drive the device of said first delay means to its second stable condition as soon as a pulse occurs, means for applying a pulse from the output of the first gating circuit to the second input of said second delay means to drive the device of said second delay means to its second stable condition, means responsive to said device of said second delay means being in its second stable condition for unblocking said fourth gating circuit, means for applying pulses from said fourth frame to the input of said fourth gating circuit, and means for causing the output pulses from said fourth gating circuit temporarily to block said first gating circuit and, in parallel with those from said third gating circuit, to produce the required changes.

9. An electrical intelligence storage arrangement, as claimed in claim 5, in which the first and second delay means each comprise an electrically bistable device having two inputs and arranged so that a pulse applied to either input will drive said device to the stable condition corresponding to that input, said arrangement further comprising second and third gating circuits each having an input and an output, means for applying pulses from said second frame to the first inputs of said first and second delay means for driving the devices thereof to their first stable conditions as soon as a pulse occurs, means responsive to said first stable condition of the device of said first delay means for applying a potential to the input of said second gating circuit, means for producing a fourth pulse frame having the same period T as the first but phase shifted by $T/2$, means for causing pulses from said fourth frame to unblock said second gating circuit, means for applying the pulses from said third frame to the second input of said first delay means to drive the device thereof to its second stable condition as soon as a pulse occurs, means resopnsive to the device of said first delay means being in said second stable condition for applying a potential to said third gating circuit, means for causing pulses from said fourth pulse frame to unblock said third gating circuit, means for applying pulses from the output of said third gating circuit to the second input of said second delay means to drive the device thereof to its second stable condition as soon as a pulse occurs, means responsive to the device of said second delay means being in its first stable condition for blocking said first gating circuit to the input of which said third pulse frame is applied, whereby the paralleled output pulses from said first and second gating circuits produce the required changes.

References Cited in the file of this patent

UNITED STATES PATENTS 2,676,245 Doelz ---------------- April 26, 1954